(12) United States Patent
Umbehocker et al.

(10) Patent No.: US 6,826,661 B2
(45) Date of Patent: Nov. 30, 2004

(54) METHODS AND SYSTEMS FOR STORAGE ARCHITECTURES

(75) Inventors: Steven Michael Umbehocker, Mercer Island, WA (US); Allen Unueco, Bellevue, WA (US); Bruce Lowe, Monroe, WA (US); Venkeepuram R. Satish, Freemont, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 242 days.

(21) Appl. No.: 10/232,132

(22) Filed: Aug. 30, 2002

(65) Prior Publication Data

US 2004/0044856 A1 Mar. 4, 2004

(51) Int. Cl.$^7$ .............................................. G06F 12/00
(52) U.S. Cl. ..................................................... 711/154
(58) Field of Search ................................ 711/154, 148, 711/6; 709/213, 214

(56) References Cited

U.S. PATENT DOCUMENTS

| | | | |
|---|---|---|---|
| 5,442,791 A | | 8/1995 | Wrabetz et al. |
| 5,655,081 A | | 8/1997 | Bonnell et al. |
| 5,758,125 A | * | 5/1998 | Misinai et al. ................. 703/23 |
| 5,838,918 A | | 11/1998 | Prager et al. |
| 6,041,386 A | * | 3/2000 | Bello ............................. 711/4 |
| 6,108,782 A | | 8/2000 | Fletcher et al. |
| 6,141,759 A | | 10/2000 | Braddy |
| 6,415,289 B1 | * | 7/2002 | Williams et al. ............... 707/10 |
| 6,430,611 B1 | | 8/2002 | Kita et al. |
| 6,480,901 B1 | * | 11/2002 | Weber et al. ................ 709/246 |
| 6,484,177 B1 | * | 11/2002 | Van Huben et al. .......... 707/10 |
| 6,622,176 B2 | * | 9/2003 | Jones et al. .................. 719/328 |
| 6,640,278 B1 | * | 10/2003 | Nolan et al. .................... 711/6 |
| 2002/0095602 A1 | | 7/2002 | Pherson et al. |
| 2002/0143942 A1 | * | 10/2002 | Li et al. ..................... 709/225 |
| 2003/0204580 A1 | * | 10/2003 | Baldwin et al. ............ 709/223 |
| 2003/0233510 A1 | * | 12/2003 | Umbehocker et al. ...... 711/100 |
| 2004/0010666 A1 | * | 1/2004 | Umbehocker et al. ...... 711/156 |

FOREIGN PATENT DOCUMENTS

| | | |
|---|---|---|
| EP | 1357465 | 10/2003 |
| WO | 00/77606 | 12/2000 |
| WO | 01/38987 | 5/2001 |
| WO | 02/25870 | 3/2002 |

OTHER PUBLICATIONS

International search report application number PCT/US03/27295 mailed Mar. 5, 2004.

Anonymous, "IBM Storage Tank ™. A Distributed Storage System", IBM Corporation, Online! Jan. 24, 2002, pp. 1–16, XP002270407, http://www.almaden.ibm.com/cs/storagesystems/stortank/ExtStorageTankPaper01__24–02.pdf.

Woithe, "A Common Interface for Host Bus Adapters", Storage Networking Industry Association Fibre Channel Wor Group (SNIA–FCWG), Online!, Jan. 28, 2001, pp. 1–4, XP002270111, http:/hbaapi.sourceforge.net/Common%20HBA%20API%20White%20Paper%20v0128011.pdf.

\* cited by examiner

*Primary Examiner*—Hiep T. Nguyen
(74) *Attorney, Agent, or Firm*—Meyertons Hood Kivlin Kowert & Goetzel, P.C.; B. Noël Kivlin

(57) ABSTRACT

Methods and systems for storage architectures are provided. Storage resource provider modules interface with storage resources to perform storage operations. A storage management data store maintains storage data associated with a storage environment of the storage resources. The storage resource provider modules retrieve and update the storage management data in response to processing the storage operations. In one embodiment, a storage management application requests a selected storage resource provider module to perform a selected storage operation. The storage management application determines the selected storage resource provider module by acquiring the storage management data in the data store.

14 Claims, 4 Drawing Sheets

METHODS AND SYSTEMS FOR STORAGE ARCHITECTURES

FIELD OF INVENTION

The present invention is related to storage architectures, and more particularly to methods, and systems that provide storage architectures to access storage management data.

BACKGROUND INFORMATION

Storage networking is the practice of connecting storage devices to computing devices (e.g., clients, servers, and the like) by using networks (e.g., Fibre Channel, Internet Small Computer System Interface (iSCSI), and others) instead of traditional point-to-point Small Computer System Interface (SCSI) channels. A network used to connect servers to storage devices is referred to as a storage area network (SAN). Typically, within a SAN environment, computing devices have access to the available storage devices. This presents a wide variety of benefits, including server platform fail-over wherein a failed storage device and failed server are automatically recovered by another operational server platform and operational storage device without requiring any recabling of the operational storage devices.

Prior to the development of SAN technology, local and wide area networks provided access between computing devices that did not always include storage devices. Connections were established with network protocols such as Transmission Communication Protocol (TCP), Unreliable Datagram Protocol (UDP), and others. Some of these protocols ensure that message ordering is preserved and that messages are not lost. Distributed File Systems (DFS) such as network file system (NFS) and Common Internet file system (CIFS) are layered on top of network protocols. Distributed File Systems provide uniformed named access to files and their data storage devices across a network consisting of heterogeneous computing devices. Using DFS, access to files or data storage devices is transparent to any particular computing device. Thus, access is consistent across the DFS without the need for physical locations or other details associated with any particular file or data. This access transparency is often referred to as storage virtualization.

Storage arrays provide access to storage disks within a shared storage environment. The storage arrays include the storage disks, software to access those storage disks, controllers, memory, power supplies, and the like. Host applications within the shared storage environment communicate with the storage arrays to gain access to storage locations on the storage disks controlled by the storage arrays. However, this access is typically in the form of vendor-specific interfaces provided by the vendors of the storage arrays. In some cases, vendors provide software libraries to gain access to the storage arrays (e.g., by implementing APIs). In other cases, vendors provide command line interfaces, where the commands are encoded in a specific data format, such as Extensible Markup Language (XML) data format and others.

Often storage management applications are interposed between the host applications and the underlying physical storage arrays. This is done, to free the host applications from the responsibilities of maintaining storage as well as to centralize storage management. Each storage management application is responsible for managing storage for a plurality of host applications and a plurality of storage arrays. However, in a heterogeneous shared storage environment with disparate storage arrays, the storage management applications are forced to know and manage a variety of interfaces in order to properly maintain and manage storage for the host applications.

Moreover, existing storage architectures do not make storage management data centrally accessible to the applications that manage each vendor's storage arrays. Storage management data is critical to any storage architecture; it includes, for instance, configuration settings associated with each storage array. Conventionally, applications aggregate the storage management data from the storage arrays and assimilate the results in isolation from other applications. However, if the various applications are not well integrated and coordinated, then the quality and timeliness of the storage data can be impacted.

Therefore, there is a need for a system and method for flexibly managing storage. Furthermore, there is a need to centrally provide storage management data, where the storage management data can be accessed by each of the applications in order to provide a consistent representation of a storage environment.

SUMMARY OF THE INVENTION

According to one aspect of the present invention, a method of managing storage across a heterogeneous storage environment is presented. A storage management application is provided that is interfaced to a host application. A plurality of storage resource provider modules is associated with the storage management application. Moreover, storage management data is stored on a storage management data store. The storage management data is associated with the storage management application and with each of the storage resource provider modules. Further, the storage management application accesses the data store when receiving a request to access a selected storage resource from the host application in order to be assigned to one of the storage resource provider modules by the data store. The assigned storage resource provider module retrieves and stores storage management data from and to the data store in order to satisfy the request.

According to another aspect of the present invention, a storage management architecture system is provided. The storage management architecture system includes a plurality of storage resources, a plurality of storage resource provider modules, and a storage management data store having storage management data. Each of the storage resource provider modules interfaces with a different storage resource, and stores and retrieves storage management data from and to the data store in order to maintain a consistent storage environment representation in the data store.

According to yet another aspect of the present invention, another storage management architecture system is disclosed. The storage management architecture system includes a plurality of storage resources, where each storage resource includes an interface used to perform storage management operations on the storage resources, and where two or more of the interfaces are different from one another. The storage management architecture system also includes a plurality of storage resource provider modules, where each storage resource provider module communicates with one of the interfaces. Additionally, the storage management architecture system includes a storage management data store capable of storing storage management data associated with the storage management operations. The storage resource provider modules act as an intermediary on behalf of a calling application when processing the storage management operations, and the provider modules retrieve and store results associated with processing the storage management operations in the data store.

DESCRIPTION OF THE PREFERRED EMBODIMENTS

In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

As used herein a "storage management application" includes software modules or applications that manage storage resources on behalf of host applications. In some instances, storage management applications are Volume Manager (VM) applications processing in a shared storage environment, such as a Storage Area Network (SAN) environment or any networked environment (e.g., TCP/IP using iSCSI and others). In other instances, the storage management application is a SAN manager application, or other storage management operation, such as a snapshot operation, a mirror operation, and the like. Host applications are applications that interface with the storage management applications to gain access to storage resources.

In various embodiments of the present disclosure, storage arrays include storage resources, software (e.g., native storage array provided interfaces) to access the storage resources, controllers, memory, power supplies, and the like. Storage resources can include whole storage arrays, storage disks, communication ports, Logical Unit Numbers (LUNs) assigned to communication ports, Access Control Lists (ACLs), Host Bus Adapters (HBAs), virtual storage disks assigned by the storage arrays, bindings, and the like. The storage arrays typically include front-end adapter interfaces that are accessible to the host applications to access the storage resources and back-end adapter interfaces that the storage array uses to control the storage resources directly.

In various embodiments of the present disclosure, the front-end adapter interfaces are interfaced to storage resource provider modules. Beneficially, the back-end adapter interfaces may remain unchanged with the teachings of the present disclosure. Storage arrays themselves may additionally be storage appliances, high-density or blade servers, or maybe internally embedded in switches. Moreover, depending upon the operations being performed on a storage array, a storage array can be designated a host. Similarly, under some conditions, a host can be designated a storage array.

Figure 1:
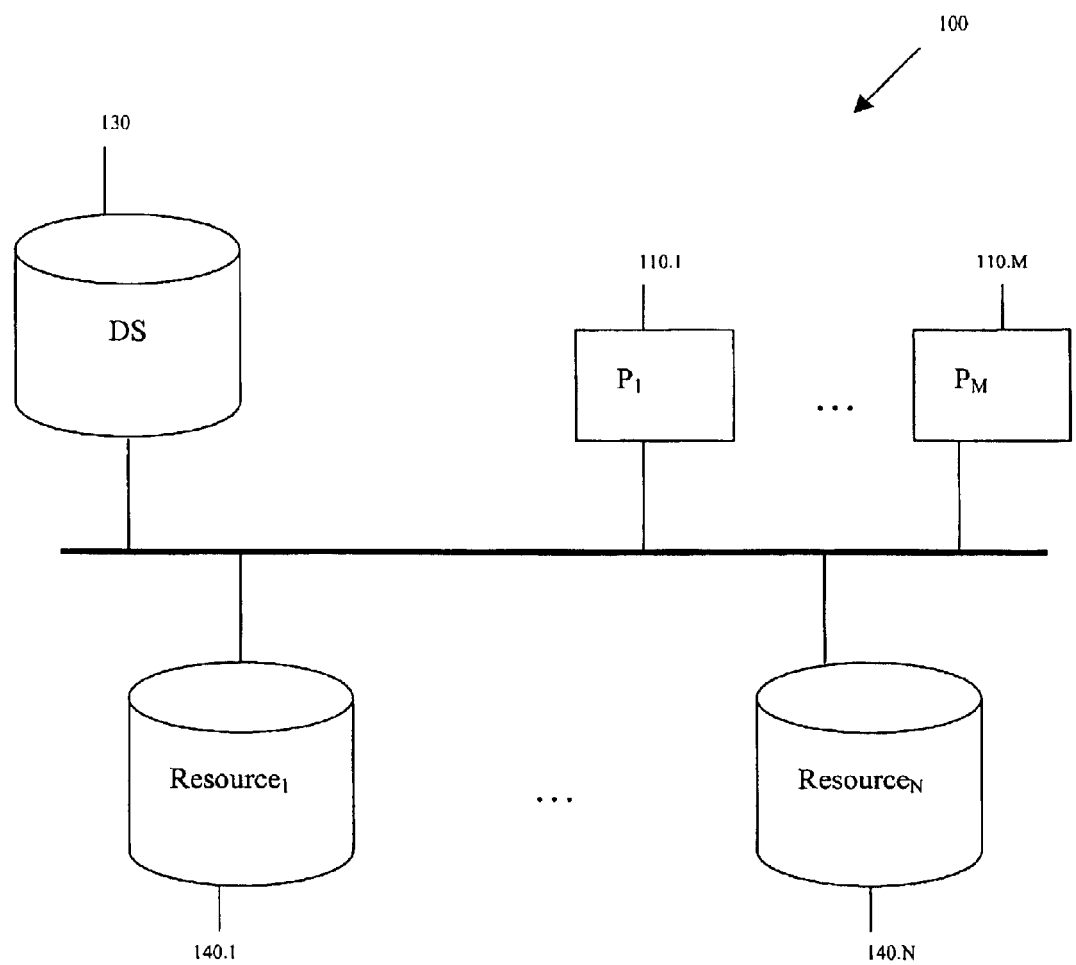
FIG. 1 shows a flow diagram of one method for providing storage architectures, according to the present invention.

FIG. 1 illustrates a block diagram of one storage architecture system 100, according to the present invention. The storage architecture system 100 includes a plurality of storage provider resource modules (e.g., 110.1–110.M) and a storage management Data Store (DS) 130 having storage management data (e.g., configuration settings) associated with storage resources (e.g., 240.1–140.N) of a storage environment for the storage architecture system 100.

Each of the storage resource provider modules 110 is implemented to interface with a different storage resource 140. The storage resource provider modules 110 store and retrieve storage management data from and to the DS 130. In this way, the storage resource provider modules 110 assist in maintaining a consistent and stable storage environment representation within the DS 130, when storage management data is altered or otherwise accessed. This storage environment representation is centrally managed and available through the DS 130 to the storage resource provider modules 110 and any other application processing in the storage environment. A DS 130 is described in U.S. patent application Ser. No. 10/113,394, the description of which is incorporated by reference herein.

In one embodiment, the storage management architecture system also includes a storage management application (e.g., VM, SAN manager, or other storage operation) (not shown in FIG. 1). The storage management application receives storage management operations from a plurality of host applications. These operations are inspected by the storage management application to determine the appropriate storage resource 140 that is impacted by the operations. The DS 130 is then queried to determine the appropriate storage resource provider module 110 needed in order to process the operations on behalf of the storage management application. Results associated with the operations are made available to the storage management application in the DS 130. In this way, the storage management application indirectly interfaces with each of the storage resources 140 through the storage resource provider modules 110.

In one embodiment, the storage resources 140 are storage arrays having disparate interfaces that are needed to perform storage management operations on them. Interfaces are disparate when the commands, naming standards, calling syntaxes, and/or parameter orders are different. In some cases, the interfaces are disparate when different vendors provide the storage arrays or when different versions/releases of storage arrays are not compatible.

In some instances, a plurality of host applications are permitted access to DS 130 in order to acquire the storage management data. The host applications can use the storage management data to make decisions about whether to process a particular storage management operation. In this way, the DS 130 is available for use by any application within the storage environment, and any application altering the storage management data can directly or indirectly cause the storage management data to be updated within the DS 130. Thus, operations performed by applications are coordinated, synchronized, and managed through the DS 130, without requiring code modifications to each of the applications operating within the storage environment.

The DS 130 provides access and update methods to the storage resource provider modules 110 and any other applications processing within the storage environment. In some cases, the methods can be restricted based on security such that some methods are publicly available for use, and other methods are private having restricted use. This ensures that a rogue application cannot inadvertently alter the storage management data in a manner that is undesirable. Security can also be provided using any Public Key Infrastructure (PKI) technique, such as public-private key encryption, authentication using certificates, and/or authorization.

Another embodiment includes storage management data that has configuration settings associated with storage residing within the storage resources 140 along with state information associated with the storage resources 140. Thus, the storage provider resource modules 110 can acquire the state information from the DS 130 to determine when storage management operations can be permissibly processed on the appropriate storage resources 140 or when some storage management operations must be held in abeyance until a state changes within a storage resource 140.

Figure 2:
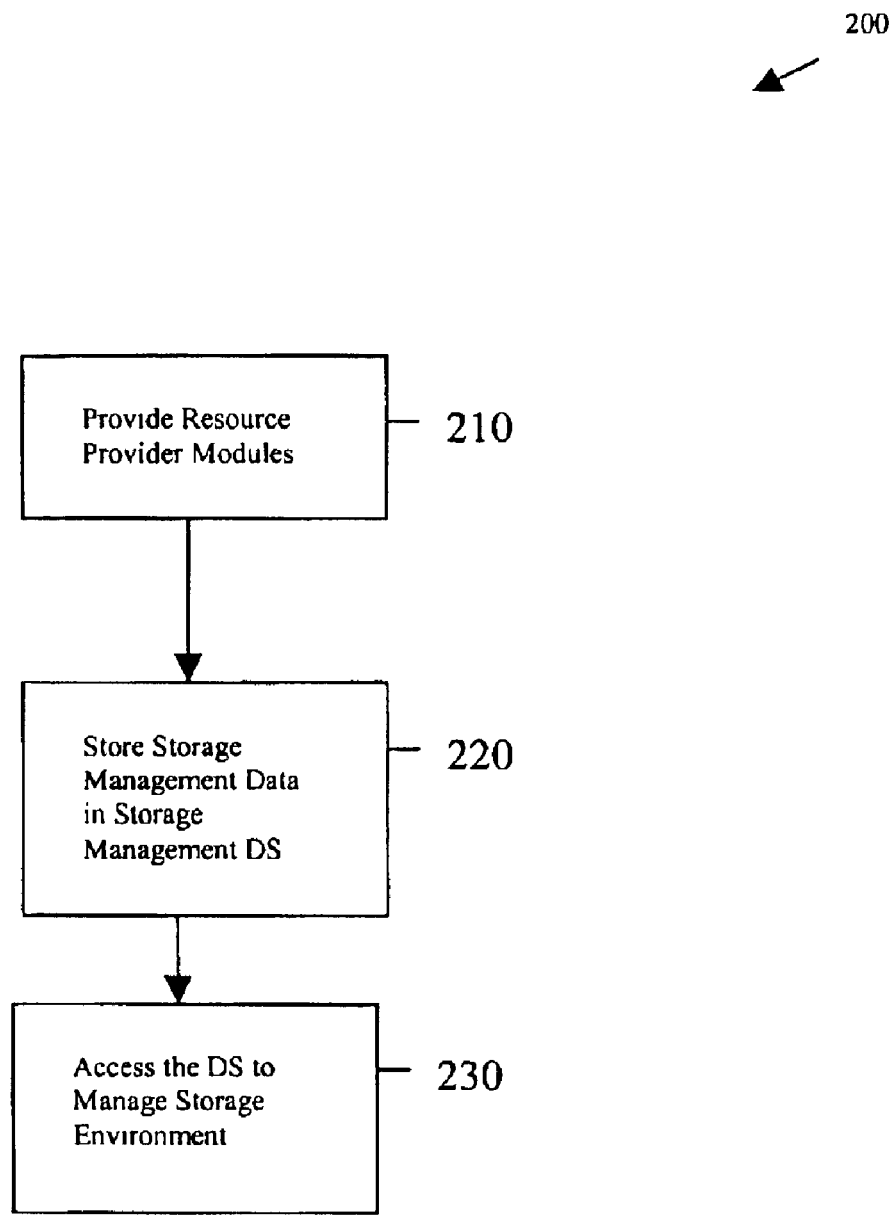
FIG. 2 shows a flow diagram of another method for providing storage architectures, according to the present invention.

FIG. 2 illustrates a flow diagram of one method 200 for managing storage across system 100, according to the present invention. System 100 includes a variety of applications that access and manage storage. In one embodiment, storage management data is provided to the applications in order to assist in accessing storage or managing the configuration settings of the storage.

In some embodiments, the applications are layered such that applications at higher levels of abstraction receive storage management data that is virtualized. Additionally, applications at lower levels of abstraction receive storage management data that is less virtualized or, in some cases, data that represents physical mappings of storage within a storage resource. In one such embodiment, a storage resource 140 represents a storage entity that includes storage management data about storage embodied by the storage entity. In various embodiments of the present disclosure, a storage resource 140 is a storage array.

Each storage array includes an interface (e.g., a set of commands, operations, and the like) that permits other applications to perform storage operations on each of the storage arrays. These operations can be used to acquire existing storage management data (e.g., configuration settings). Alternatively, the operations can be used to alter the configurations of storage, thus, altering the storage management data within the storage arrays. In a single storage architecture that is used to manage a storage environment, a plurality of disparate storage arrays can be in use.

As noted above, disparate storage arrays have different interfaces, which are used to perform storage operations. Different interfaces can include different naming procedures for commands, different syntaxes for the commands, and/or different ordering for parameters that are passed to the commands. Typically, storage arrays provided by different vendors will have disparate interfaces. However, in some cases, storage arrays provided by the same vendor can have disparate interfaces, such as when different versions/releases of one storage array is not compatible with another storage array.

In the method 200, at 210, a plurality of storage resource provider modules 110 is provided for system 100. Each storage resource provider module 110 acts as an intermediary on behalf of other applications in order to perform storage operations on a storage resource 140. The storage operations are accessed by the other applications using a consistent interface (e.g., consistent calling syntax, naming standard, and parameter passing order).

This consistent interface is used as a front-end interface for each of the storage resource provider modules 110 and is used for interactions between the other applications and the storage resource provider modules 110. In this way, the other applications need not know the individual disparate interfaces, which may be needed, to access disparate storage resources 140 within the architecture. Each storage resource provider module 110 also includes a unique back-end interface used to directly communicate with a specific storage resource 140. The storage resource provider modules 110 translate storage operations requested by the other applications from the front-end interface to an appropriate back-end interface in order to act as an intermediary to the storage resources 140 on behalf of the other applications. One such interface is described in U.S. patent application Ser. No. 10/175,029, which is incorporated by reference herein.

At 220, storage management is stored within storage management data store (DS) 130. DS 130 acts as a central data repository for all storage management data in the architecture. The storage resource provider modules 110 and other applications can access the DS 130 to acquire storage management data (e.g., storage configuration settings). Moreover, storage resource provider modules 110 can update storage management data in DS 130. In some cases, the other applications, can also update the storage management data in DS 130.

In one embodiment, DS 130 is available to storage resource provider modules 110 and the other applications over a data bus. Furthermore, DS 130 can be a single database or a plurality of databases interfaced together. DS 130 can be implemented in volatile storage, non-volatile storage, or in a combination of volatile and non-volatile storages. Access to DS 130 can be achieved with any existing or custom-developed Application Programming Interface (API) library. DS 130 maintains a consistent representation of the storage environment for system 100. This consistent representation is embodied in the storage management data.

Thus, at 230, DS 130 is accessed to manage the storage environment. Please note, DS 130 and the storage management data can be used to interface the various applications, the storage resource provider modules 110, and the storage resources 140. For example, if a first application wants to perform a first storage operation on a first storage resource 140.1, then the first application can access DS 110 providing DS 110 with the storage resource 140.1. DS 130 then determines that the storage resource 140.1 is associated with a first storage resource provider module 110.1, and activates a call to the first storage resource provider module 110.1 to interact with the first application and the first storage resource 140.1. The first storage resource provider module 110.1 then translates the first storage operation by using its front-end and back-end interfaces into commands recognized by the first storage resource 140.1. The first storage resource 140.1 processes the commands, and the updated storage management data is provided to DS 130. The first application can then obtain the updated storage management data from DS 130. In this way, DS 130 and the storage management data are used to interface the various components of the storage architecture (e.g., the applications, the storage resource provider modules, and the storage resources).

In one embodiment, this is achieved by representing the storage resources 140 as storage objects having public and private accessible methods. The storage objects can be arranged hierarchically and managed by DS 130. In this way, the DS 130 can use the storage resource's methods to resolve and bind the appropriate storage resource provider modules 110 to the appropriate storage resources 140.

As one of ordinary skill in the art now appreciates, storage architectures can be provided by implementing method 200, where the architectures are more flexibly managed. Moreover, the architectures permit the integration of new applications with minimal or no code changes required of existing applications. Conventionally, the integration of new applications required significant coding changes to existing applications, since storage management data was not centrally accessible to the applications, and was therefore passed and carried around in storage by each of the applications during processing. Furthermore, there is no requirement with the present invention for operations to be processed synchronously since asynchronous operations are also permissible. Additionally, DS 130 can include task objects that when accessed provide the current state, status, or progress of a previously requested and/or pending operations. Additionally, new provider modules 110 can be dynamically integrated and installed into DS 130, thereby providing continuity of service. Also, DS 130 can issue alerts to applications indicating when high priority changes to the storage environment have occurred.

Figure 3:
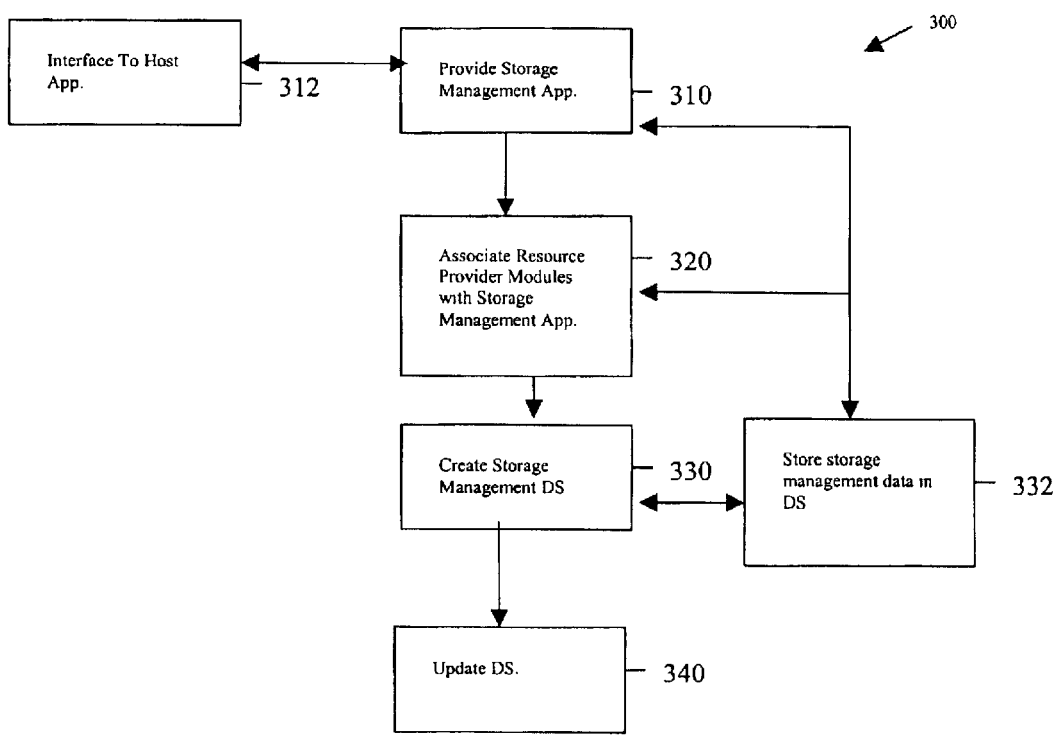
FIG. 3 shows a block diagram of one storage architecture system, according to the present invention.

FIG. 3 illustrates a flow diagram of another method 300 for managing storage across system 100, according to the present invention. At 310, a storage management application is provided. The storage management application can be VM, SAN manager, or other storage management operations, such as a snapshot operation, a mirror operation, and the like.

At 312, the storage management application is interfaced to a host application. A host application can be any application that accesses storage located within a storage resource 140. The storage management application intercepts accesses destined for the storage resource 140 and fulfills the access requests on behalf of the host application. In this way, the storage management application can manage storage more efficiently within a storage environment.

At 320, storage resource provider modules 110 are associated with the storage management application. In one embodiment, each storage resource provider module 110 interfaces with a distinct storage resource 140. All storage resource provider modules 110 include a consistent interface (e.g., naming standard, calling syntax, parameter order, and the like), which is presented to the storage management application for use. This consistent interface is used by the storage management application to request that storage operations be performed on a storage resource 140. The requested storage operations can originate from the host application. Alternatively, the requested storage operations can originate from the storage management application, such as when the storage management application is performing scheduled operations or when the storage management application detects information in the storage environment that warrants a request for a storage management operation.

At 330, a storage management DS 130 is created. DS 130 is interfaced to the storage resource provider modules 110, the storage application, and in some cases, the host application. In one embodiment, DS 130 is available via a data bus to the storage management application and the storage resource provider modules 110. Further, DS 130 can reside in a volatile storage, a non-volatile storage, and/or a combination of volatile and non-volatile storages.

At 332, storage management data (e.g., configuration settings and the like) associated with storage residing on storage resources 110 within the storage environment is stored in DS 130. Access to the data is provided via any commercially available API (in cases where the DS 130 is a commercially available DS 130), via any custom-developed API (in cases where the DS 130 is custom developed), via any Command Line Interface (CLI), and/or via any protocol. Moreover, in one embodiment, DS 130 is accessible via an Object Module (OM) architecture, where storage resources 140 and/or elements residing in the storage environment are represented as objects having methods (e.g., public and private) to retrieve and update storage management data.

The storage management application accesses DS 130 when receiving a request from the host application to access a selected storage resource 140 residing within the storage environment. The DS 130 access results in the storage management application being directed to an appropriate storage resource provider module 110. In an OM embodiment, the DS 130 executes a method associated with the storage resource object in order to resolve the interface to use with the storage resource 140. The interface is provided to the DS 130 as a dynamic pointer to a specific storage resource provider module 110.1. Thus, the storage management application is indirectly assigned the specific storage resource provider 110.1 to act on its behalf when satisfying the request from the host application. As one skilled in the art readily recognizes, this permits storage resources 140 to have interfaces dynamically added, modified, and/or deleted, by having the DS 130 resolve the interface pointer when access is requested of a storage resource object.

The assigned storage resource provider module 110.1 translates the request into formats, syntax, and commands recognized by the appropriate storage resource 140.1, and permits the storage resource 140.1 to process the request. At 340, storage management data associated with satisfying the request is then updated in the DS 130 by the assigned storage resource provider module 110.1. The updated storage management data is then available to the storage management application to provide to the host application.

In some embodiments, the storage resource provider modules 110 also listen for events that occur within their assigned storage resources 140. These events can be raised when state changes occur within the storage resources 140, signaling that the storage management data (e.g., configuration settings) have been altered. When such events are detected, the storage resource provider modules 110 can automatically and dynamically update the corresponding storage management data in the DS 130. In this way, the DS 130 includes a timely and accurate representation of the storage management data for the entire storage environment.

Figure 4:
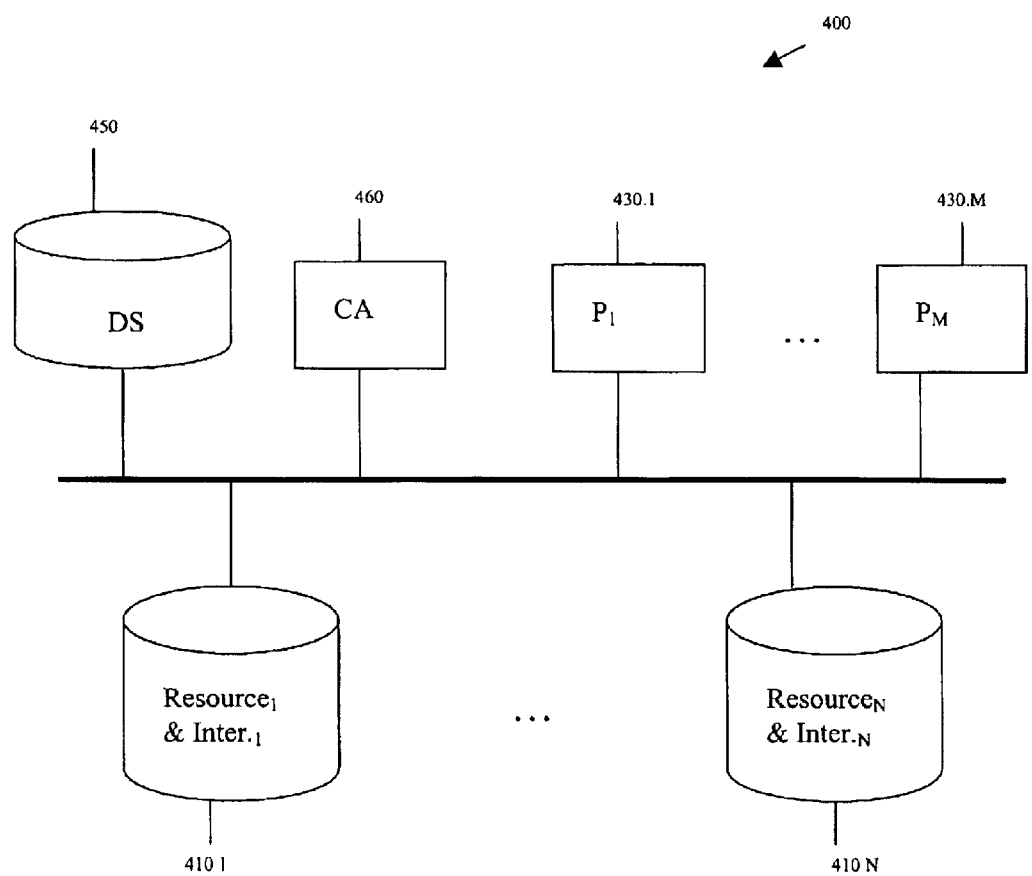
FIG. 4 shows a block diagram of another storage architecture system, according to the present invention.

FIG. 4 illustrates a block diagram of another storage architecture system 400, according to the present invention. The storage architecture system 400 includes a plurality of storage resources 410.1–410.N, a plurality of storage resource provider modules 430.1–430.M, a storage management DS 450, and a calling application (CA) 460. Each of the storage resources 410 includes interfaces (e.g., commands and operations having specific calling syntaxes, naming standards, and parameter orders) that permit the processing of storage management operations thereon. A number of the storage resource interfaces 410 are different. In other words, the calling syntaxes, naming standards for commands, and/or parameter ordering for commands are different for one storage resource 410.1 and another storage resource 410.N.

Each storage resource provider module 430 communicates with a specific storage resource interface 410. The storage resource provider modules 430 act as intermediaries between the CA 460 and the storage resources 410. Thus, when the CA 460 is requesting a storage management operation a storage resource provider module 430 is called (directly or indirectly) to process the storage management operation on behalf of the CA 460. Results associated with processing the storage management operation can be retrieved by the CA 460 from the DS 450, and stored by the appropriate storage resource provider modules 430 in the DS 450.

The DS 450 includes storage management data (e.g., configuration settings or state information associated with the storage resources 410. The DS 450 is used to store and retrieve storage management data and provides a centrally located repository for acquiring configuration and state information about the storage environment. In the embodiment shown, DS 450 can be accessed over a network and provides an API library permitting access to the DS 450 from external applications (e.g., the CA 460 or the storage resource provider modules 430).

The CA 460 can also, in some embodiments, acquire storage management data directly from the DS 450. The CA 460 can also use the DS 450 to determine the appropriate storage resource provider module 430 that is to be used to process a storage management operation on an appropriate storage resource 410. For example, the CA 460 can query the DS 450 with a storage resource identifier to acquire a dynamic pointer reference to an appropriate storage resource provider module 430.

Of course it is readily apparent to one of ordinary skill in the art, that a variety of other techniques can be used to resolve which storage resource provider module 430 is appropriate for the CA 460 in any given circumstance. For example, the CA 460 can access methods of a storage resource object, where internally the storage resource object was instantiated and includes private methods to bind an appropriate storage resource provider module. All such techniques are intended to fall within the scope of the present disclosure.

The CA 460 can be a storage management application or a host application. Moreover, the CA 460 is presented by each of the storage resource provider modules 430 with a consistent calling syntax to perform storage management operations. Each of the storage resource provider modules 430 translates the consistent calling syntax into a specific syntax recognized by their assigned storage resource interfaces 410.

CONCLUSION

The methods and systems discussed above permit improved storage architectures. These architectures include storage resource provider modules that act as gatekeepers for storage resources in a storage environment. The storage resource provider modules also permit other applications to process storage management operations using a consistent calling syntax, naming standard, and parameter order. Each storage resource provider module communicates directly with one of the storage resources. Moreover, the architectures include a storage management DS that centrally provides storage management data (e.g., configuration settings and state information) for all the storage resources. The DS is accessed and updated by the storage resource provider modules, and in some instances other applications processing within the storage environment.

As one of ordinary skill in the art now appreciates upon reading the present disclosure, the methods and systems presented in this disclosure permit more flexible implementations of storage management architectures that are easier to develop and maintain. Moreover, newly developed applications can be more robust, since they can be integrated within the storage architecture independent of the coding details associated with other existing applications. The DS of the present disclosure permits applications to operate independent of one another, since the DS includes a consistent and stable representation of the storage environment at any particular moment.

Although specific embodiments have been illustrated and described herein, it will be appreciated by one of ordinary skill in the art that any arrangement that is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A storage management architecture system, comprising:
   a plurality of storage resources;
   a plurality of storage resource provider modules; and
   a storage management data store having storage management data;
   wherein each of the storage resource provider modules interfaces with a different storage resource, and stores and retrieves storage management data to and from the data store in order to maintain a consistent storage environment representation in the data store.

2. The storage management architecture of claim 1 further comprising:
   a plurality of host applications and a storage management application that receives storage management operations from the plurality of host applications;
   wherein the storage management application accesses the data store to select the storage resource provider modules that will process operations on behalf of the storage management application.

3. The storage management architecture system of claim 2 wherein a storage resource is dynamically bound to a storage resource provider module within the data store.

4. The storage management architecture system of claim 3, wherein a storage management application uses the storage management data included in the data store to manage a storage environment on behalf of the plurality of host applications, and wherein the storage management application uses the storage resource provider modules to indirectly interface with the storage resources.

5. The storage management architecture system of claim 1, wherein the storage resources include storage arrays and wherein two or more of the storage arrays have disparate interfaces from one another, where the interfaces are used to perform storage management operations on the storage arrays.

6. The storage management architecture system of claim 1, wherein the storage management data is used to make decisions about storage management operations.

7. The storage management architecture system of claim 1, wherein the data store is a database having access and update methods, where a number of the methods are publicly available for use and a number of the methods are private having restricted use.

8. The storage management architecture system of claim 1, wherein the storage management data includes storage configuration settings and states associated with the storage resources.

9. A storage management architecture system, comprising:
   a plurality of storage resources, wherein each storage resource includes an interface used to perform storage management operations on the storage resources, wherein two or more of the interfaces are different from one another;

a plurality of storage resource provider modules, wherein each storage resource provider module communicates with one of the interfaces; and a storage management data store capable of storing storage management data associated with the storage management operations;

wherein the storage resource provider modules act as an intermediary on behalf of a calling application when processing the storage management operations, and the provider modules retrieve and store results associated with processing the storage management operations in the data store.

10. The storage management architecture system of claim 9, wherein the calling application is at least one of a host application and a storage management application.

11. The storage management architecture system of claim 9, wherein the calling application retrieves the storage management data from the data store.

12. The storage management architecture system claim 9, wherein the storage resource provider modules access the data store is accessible over a network.

13. The storage management architecture system of claim 9, wherein the calling application requests one of the storage management operations by calling a storage resource provider module associated with a particular storage resource.

14. The storage management architecture system of claim 9, wherein the provider modules provide consistent calling syntaxes to the calling application for requesting the storage operations.

* * * * *

(12) INTER PARTES REEXAMINATION CERTIFICATE (0158th)
United States Patent
Umbehocker et al.

(10) Number: US 6,826,661 C1
(45) Certificate Issued: May 11, 2010

(54) METHODS AND SYSTEMS FOR STORAGE ARCHITECTURES

(75) Inventors: Steven Michael Umbehocker, Mercer Island, WA (US); Allen Unueco, Bellevue, WA (US); Bruce Lowe, Monroe, WA (US); Venkeepuram R. Satish, Freemont, CA (US)

(73) Assignee: Veritas Operating Corporation, Mountain View, CA (US)

Reexamination Request:
No. 95/000,169, Sep. 5, 2006

Reexamination Certificate for:
Patent No.: 6,826,661
Issued: Nov. 30, 2004
Appl. No.: 10/232,132
Filed: Aug. 30, 2002

(51) Int. Cl.
*G06F 17/30* (2006.01)
*G06F 12/00* (2006.01)

(52) U.S. Cl. .................. 711/154; 707/E17.01
(58) Field of Classification Search ............. 707/1, 707/100
See application file for complete search history.

(56) References Cited

U.S. PATENT DOCUMENTS

| | | | |
|---|---|---|---|
| 5,210,875 A | 5/1993 | Bealkowski et al. | |
| 6,519,679 B2 | 2/2003 | Devireddy et al. | |
| 6,678,700 B1 * | 1/2004 | Moore | |
| 6,826,661 B2 * | 11/2004 | Umbehocker et al. | |
| 6,850,945 B2 * | 2/2005 | Lanzatella et al. | 707/100 |
| 6,944,654 B1 | 9/2005 | Murphy et al. | |

OTHER PUBLICATIONS

Complaint by Veritas Operating Corporation, filed May 18, 2006 (*Veritas Operating Corporation v. Microsoft Corporation,* CV–06–0703–JCC).

Amended Answer, Affirmative Defenses, and Counterclaim by Microsoft, filed Jun. 21, 2006 (*Veritas Operating Corporation v. Microsoft Corporation,* CV–06–0703–JCC).

Reply to Counterclaims by Veritas Operating Corporation, filed Aug. 1, 2006 (*Veritas Operating Corporation v. Microsoft Corporation,* CV–06–0703–JCC).

*Veritas Operating Corporation v. Microsoft Corporation,* Stipulation and Order to Stay Action With Respect ti U.S. Patent No. 6,826,661, filed Nov. 13, 2006, and granted Nov. 14, 2006.

Vogels, Werner et al., "The Design and Architecture of the Microsoft Cluster Service—A Practical Approach to High–Availability and Scalability," Proceedings of FTCS'98, Munich, Germany, Jun. 1998.

Veritas, "Veritas Isis 3.0 Migration Guide: Upgrading to 3.0 from 2.1," Veritas Software Corporation, 1600 Plymouth St., Mountain View, CA 94043, 2000.

Veritas, "Veritas Volume Manager 2.4 for Windows NT User's Guide Beta Release Windows NT 4.0," Veritas Software Coporation, 1600 Plymouth St., Mountain View, CA 94043, Mar. 2000.

Veritas, "Veritas Volume Manager for Windows 2000 Release Notes Release 2.5," Jul. 2000.

(Continued)

*Primary Examiner*—Sam Rimell

(57) ABSTRACT

Methods and systems for storage architectures are provided. Storage resource provider modules interface with storage resources to perform storage operations. A storage management data store maintains storage data associated with a storage environment of the storage resources. The storage resource provider modules retrieve and update the storage management data in response to processing the storage operations. In one embodiment, a storage management application requests a selected storage resource provider module to perform a selected storage operation. The storage management application determines the selected storage resource provider module by acquiring the storage management data in the data store.

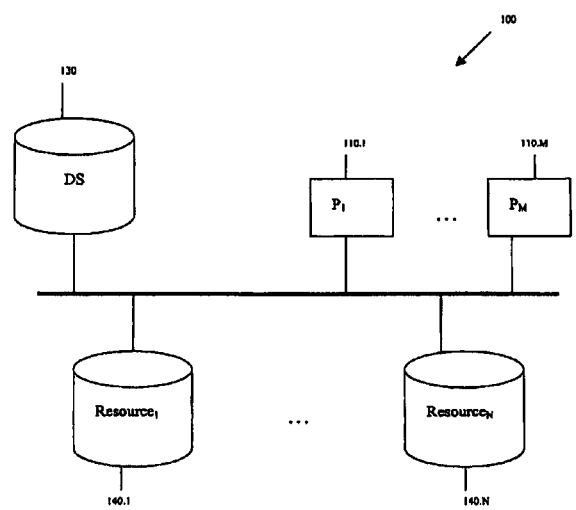

OTHER PUBLICATIONS

Veritas, "Veritas Volume Manager 2.5 for Windows 2000 User's Guide," Veritas Software Corporation, 1600 Plymouth St., Mountain View, CA 94043, Jul. 2000.

Veritas, "Veritas Volume Manager 2.6 for Windows NT User's Guide Windows NT 4.0," Veritas Software Corporation, 1600 Plymouth St., Mountain View, CA 94043, Dec. 2000.

Veritas, "Veritas Volume Manager for Windows NT Release Notes Release 2.6," Veritas Software Corporation, Dec. 2000.

Veritas, "Veritas Volume Manager 2.7 for Windows 2000 User's Guide," Veritas Software Corporation, 1600 Plymouth St., Mountain View, CA 94043, Jan. 2001.

Veritas, "Veritas Volume Manager 2.7 Release Notes for Windows 2000," Veritas Software Corporation, 1600 Plymouth St., Mountain View, CA 94043, Mar. 2001.

Veritas, "Veritas Volume Manager 2.7 for Windows 2000 Release Notes," Veritas Software Corporation, 1600 Plymouth St., Mountain View, CA 94043, Apr. 2001.

Veritas, "Volume Manager 2.7 for Windows 2000 User's Guide," Veritas Software Corporation, 1600 Plymouth St., Mountain View, CA 94043, Jun.. 2001.

Veritas, "Veritas Volume Manager 2.7 for Windows NT User's Guide Windows NT 4.0," Veritas Software Corporation, 1600 Plymouth St., Mountain View, CA 94043, May 2001.

Veritas, "Veritas Volume Manager 2.7 for Windows 2000 User's Guide," Veritas Software Corporation, 1600 Plymouth St., Mountain View, CA 94043, Apr. 2001.

Veritas, "Veritas Volume Manager 3.0 for Windows 2000 User's Guide," Veritas Software Corporation, 350 Ellis St., Mountain View, CA 94043, Feb. 2002.

Veritas, "Veritas Edition 1.0 for Microsoft Exchange 2000 User's Guide Windows 2000," Veritas Software Corporation, 350 Ellis St., Mountain View, CA 94043, Mar. 2002.

Veritas, "Veritas Volume 3.1 for Windows 2000 Release Notes," Veritas Software Corporation, 350 Ellis St., Mountain View, CA 94043, Aug. 2002.

Aschmann, Hans–Ruedi et al., "Alphorn: A Remote Procedure Call Environment for Fault–Tolerant, Heterogeneous, Distributed Systems," IEEE Micro, pp. 16–19, Oct. 1991.

Borghoff, Uwe M. and Kristof Nast–Kolb, "Distributed Systems: A Comprehensive Survey," Institut für informatik, Technische Univeristät München, Postfach 20 24 20, D–8000, Münchén 2, Germany, pp. 1–85, Nov. 1989.

Burkhard, Walter A. et al., "The Gemini Raplicated File System Test–bed," IEEE (1987).

Chen, Shu–Wie F. and Calton Pu, "An Analysis of Replica Control," IEEE, pp. 22–25, 1992.

Chevalier, Pierre–Yves, "A Replicated Object Server fro a Distributed Object–Oriented System," 11th Symposium on Reliable Distributed Systems, Proceedings, Houston, TX IEEE, pp. 4–11, Oct. 5–7, 1992.

Chulani, Sailesh et al., "The Episode File System." (undated).

Dell, "Style Guide—OpenManage Server Administrator (OMSA) User Interface Version 2.0," Dell, Nov. 1, 2001.

Elnozahy, Elmootazbellah N. and Willy Zwaenepoel, "An Integrated Approach to Fault Tolerance," Department of Computer Science, Rice University, Houston, TX. (undated).

Floyd, Rick and Carla Schlatter Ellis, "Pushing the Limits of Transparency in Distributed File Systems," Distributed Computing Systems, Chapter 9, pp. 447–462. (undated).

Golding, Richard A., "Weak Consistency Group Communication for Wide–Area Systems", pp. 13–16, IEEE (1992).

Guy, Richard G., Ph.D dissertation, "Focus: A Very Large Scale Reliable Distributed File System," Computer Science Department, University of California, Los Angeles, Los Angeles, C, 90024–1596, Jun. 3, 1991.

Guy, Richard G., Master's thesis, "a Replicated File System Design for a Distributed UNIX™ System," 1987.

Herlihy, Maurice, "A Quorum–Consensus replication Method for Abstract Data Types," ACM Transactions on Computer Systems, pp. 32–53, vol. 4, Feb. 1986.

Herlihy, Maurice, "Comparing How Atomicity Mechanisms Support Replication," ACM, pp. 102–110, 1985.

Herlihy, Maurice, "Concurrency versis Availability: Atomicity Mechanisms for Replicated Data," ACM Transactions on Computer Systems, pp. 249–274, ACM, Aug. 1987.

Howard, John H., "Using Reconciliation to Share Files Between Occasionally Connected Computers," Mitsubishi Electric Research Laboratories, Inc., 201 Broadway, Cambridge, MA, 02139, May 27, 1993.

Veritas, "Veritas Isis 3.0.0, 115 Migration Guide: Upgrading to 3.0 from 2.1," Veritas Software Corporation, 1600 Plymouth St., Mountain View, CA, 94043 (2000).

Veritas, "Veritas Isis 3.0.0, 115 Installation Guide," Veritas Software Corporation, 1600 Plymouth St., Mountain View, CA, 94043, Dec. 2000.

Veritas, "Isis Customer Support Information," Dec. 4, 2000.

Veritas, "Array Manager by Veritas, User's Guide," Apr. 1999.

Veritas, "Veritas Array Management Class Definitions and Architecture," Feb. 2000.

Veritas, "Managing Online Volumes in Windows Operating Systems," May 25, 2000.

Walker, Bruce James, PhD Dissertation, "Issues of Network Transparency and File Replication in the Distributed Filesystem Component of Locus," University of California, Los Angeles, 1983.

Dell, "Dell OpenManage Array Manager User's Guide," Jun. 1, 1999.

Dell, "Dell OpenManage Array Manager 2.0," Jul. 14, 2000.

Dell, "Dell OpenManage Array Manager 2.6 User's Guide," Dec. 2000.

Dell, "Dell OpenManage Array Manager 2.7 User's Guide," Jan. 25, 2001.

Dell, "Dell OpenManage Array Manager 3.0 User's Guide," May 2001.

Dell, "Dell OpenManage Array Manager 3.1.2 User's Guide," Jan. 2002.

Dell, "Dell OpenManage Array Manager 3.1.3 User's Guide," May 2002.

Dell, "Dell OpenManage Array Manager 3.2," Jun. 2002.

Dell, "Dell OpenManage Array Manager 3.3," Aug. 2002.

Kowalski O. C. and H. Hartig, "Protection in the BirliX Operating System," 10™ International Conference on Distributed Computing Systems, Proceedings, pp. 160–166, May 1990.

Ladin, Rivka et al, "Providing High Availability Using Lazy Replication," ACM Transactions on Computer Systems, pp. 360–391, vol. 10, No. 4, Nov. 1992.

Ladin, Rivka and Barbara Liskov, "Lazy Replication: Exploiting the Semantics of Distributed Services," ACM, pp. 43–57, 1990.

Liskov, Barbara et al., "Replication in the Harp File System," ACM, pp. 226–238, 1991.

McCue, Daniel, et al., "Computing Replica Replacement in Distributed Systems," IEEE Second Workshop on Replicated Data, Proceedings, pp. 58–61, Nov. 1992.

Page, Jr., Thomas W. et al, "The Ficus Distributed File System: Replication Via Stackable Layers," Computer Science Department Technical Report, University of California, Los Angeles, CSD–900009, pp. 1–13, Apr. 1990.

Pu, Calton and Avraham Leff, "Replica Control in Distributed Systems: An Asynchronous Approach," ACM, pp. 377–386, 1991.

Pu, Calton, PhD dissertation, "Replication and Nested Transactions in the Eden Distributed System," pp. 1–36, 93–179, University of Washington, 1986.

*Replication Techniques in Distributed Systems,* Appendices A–C, pp. 99–152. (undated).

Ruan, Zuwang, PhD dissertation, "File Replication in Distributed Systems," Purdue University, Aug. 1986.

Satyanarayanan, Mahadev et al., "Coda: A Highly Available File System for a Distributed Workstation Environment," IEEE Transactions on Computers, pp. 447–459, vol. 39, No. 4 Apr. 1990.

Siegel, Alex et al., "Deceit: A Flexible Distributed File System," IEEE, pp. 15–17, 1990.

Sheetal, Y.V., "Vail White Paper—LUN Binding & Multiple LUN Binding, Overview and Proposed Solutions," 2003, Veritas Software Corporation.

Veritas, "Veritas Array Object Class Definitions and Management Architecture," Feb. 2000.

Veritas, "The Veritas Array Integration Layer, Architecture and Object Model, Version 3.0." (undated).

Veritas, "Veritas Vail Provider Programmer's Guide," Veritas Software Corporation, 11241 Willows Road NE, Bldg. C #300, Redmond, WA, 98052, Dec. 2000.

Veritas, "Veritas San Access Layer v1.0," Veritas Software Corporation, 1600 Plymouth St., Mountain View, CA, 94043, Sep. 7, 2000.

Veritas, "Veritas Isis 3.0 BETA Server Programmer's Guide," Veritas Software Corporation, 1600 Plymouth St., Mountain View, CA, 94043, Aug. 2000.

Veritas, "Veritas Isis 3.0 BETA Release Notes," Veritas Software Corporation, 1600 Plymouth St., Mountain View, CA, 94043 (2000).

Veritas, "Veritas Isis 3.0 BETA, Migrating to Isis 3.0 Beta from 2.1," Veritas Software Corporation, 1600 Plymouth St., Mountain View, CA 94043 (2000).

Veritas, "Veritas isis 3.0 BETA Installation Guide," Veritas Software Corporation, 1600 Plymouth St., Mountain View, CA 94043 (2000).

Veritas, "Veritas Isis 3.0 BETA Client Programmer's Guide," Veritas Software Corporation, 1600 Plymouth St., Mountain View, CA, 94043, Aug. 2000.

Veritas, "Veritas Isis 3.0 Alpha, Migrating to Isis 3.0 Alpha from 2.1," Veritas Software Corporation, 1600 Plymouth St., Mountain View, CA, 94043 (2000).

Veritas, "Veritas Isis v2.1 Programmer's Guide," Veritas Software Corporation, 1600 Plymouth St., Mountain View, CA, 94043 Mar. 2000.

Veritas, "Veritas Isis v2.1 Quick Start Guide," Veritas Software Corporation, 1600 Plymouth St., Mountain View, CA, 94043 (2000).

Veritas, "Veritas Isis 3.0.0.115 Client Programmer's Guide," Veritas Software Corporation, 1600 Plymouth St., Mountain View, CA, 94043, Dec. 2000.

Veritas, "Veritas Isis 3.0.0.115 Server Programmer's Guide," Veritas Software Corporation, 1600 Plymouth St., Mountain View, CA, 94043, Dec. 2000.

Veritas, "Veritas Isis 3.0.0.115 Release Notes," Veritas Software Corporation, 1600 Plymouth St., Mountain View, CA, 94043 (2000).

Karnani, Navneet and Subhadeep De, "User Guide Document for ISIS Web Gui," May 2, 2001.

Veritas, "Veritas Isis 3.0 Alpha Release Notes," Veritas Software Corporation, 1600 Plymouth St., Mountain View, CA, 94043 (2000).

Dell, "Dell OpenManage Array Manager 2.5 User's Guide," Nov. 2000.

Dell, "Dell OpenManage Array Manager 3.1 User's Guide," Oct. 2002.

Veritas Volume Manager™ 2.5 for Windows 2000. User's Guide. (Jul. 2000).

Legato GEMS Smart Media: Installation & Administration Guide (Oct. 1999).

Legato Smart Media Device Developer's Kit Guide (Aug. 20, 1998).

IEEE Std. 1244.1–2000 ("IEEE Standard for Media Management System (MMS) Architecture") (Jun. 21, 2000).

IEEE Std 1244.2–2000 ("IEEE Standard for Media Management System (MMS) Session Security, Authentication, Initialization Protocol (SSAIP)") (Dec. 7, 2000).

IEEE Std. 1244.3–2000 ("IEEE Standard for Media Management System (MMS) Media Management Protocol (MMP)") (Jun. 21, 2000).

IEEE Std 1244.4–2000 ("IEEE Standard for Media Management System (MMS) Drive Management Protocol (DMP)") (Jun. 21, 2000).

IEEE Std 1244.5–2000 ("IEEE Standard for Media Management System (MMS) Library Management Protocol (LMP)") (Jun. 21, 2000).

The SDSC Storage Resource Broker 1998.

SRB User Manual Version 1.1.8.

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *